United States Patent [19]
Elderbaum

[11] 3,882,059
[45] May 6, 1975

[54] METHOD OF MAKING CERAMIC CAPACITOR
[75] Inventor: Gilbert J. Elderbaum, Clinton, Conn.
[73] Assignee: Technical Ceramics, Inc., Clinton, Conn.
[22] Filed: May 11, 1973
[21] Appl. No.: 359,229

[52] U.S. Cl. .................. 29/25.42; 156/89; 264/61; 317/261
[51] Int. Cl. ........................................... H01g 13/00
[58] Field of Search .......... 317/258, 261, 242, 246; 29/25.42; 156/89; 264/61

[56] References Cited
UNITED STATES PATENTS

| 2,494,699 | 1/1950 | Forrester | 317/258 X |
| 2,673,949 | 3/1954 | Khouri | 317/242 |
| 3,021,589 | 2/1962 | Weller | 29/25.42 |
| 3,235,939 | 2/1966 | Rodriguez | 29/25.42 |
| 3,379,943 | 4/1968 | Breedlove | 317/261 |
| 3,380,854 | 4/1968 | Robinson | 317/242 X |
| 3,466,513 | 9/1969 | Belko | 317/261 |
| 3,491,275 | 1/1970 | Puppolo | 317/261 X |
| 3,581,167 | 2/1970 | Veater | 317/261 |
| 3,603,850 | 9/1971 | Kirshner | 317/261 |
| 3,679,950 | 4/1971 | Rutt | 317/261 |

Primary Examiner—E. A. Goldberg
Attorney, Agent, or Firm—DeLio and Montgomery

[57] ABSTRACT

A method of making single layer capacitors of relatively high capacitive value by applying a multiplicity of conductors to opposite sides of a first green ceramic sheet, applying additional green ceramic sheets on either side of the first sheet, laminating the sheets, scoring the lamination between the conductors, sintering the green ceramic into a monolithic structure, and snapping or breaking individual capacitors from the structure along the score lines.

14 Claims, 10 Drawing Figures

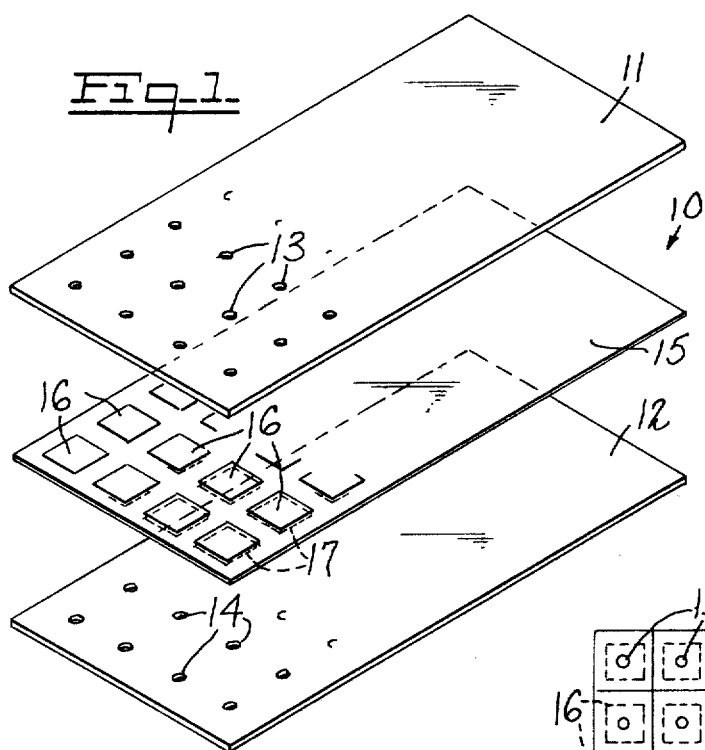
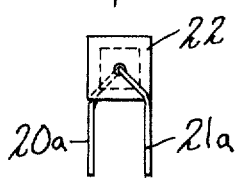
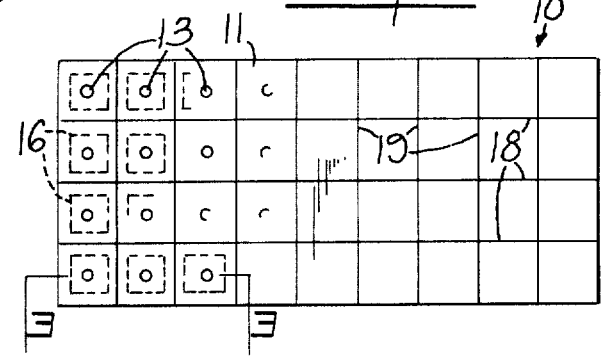
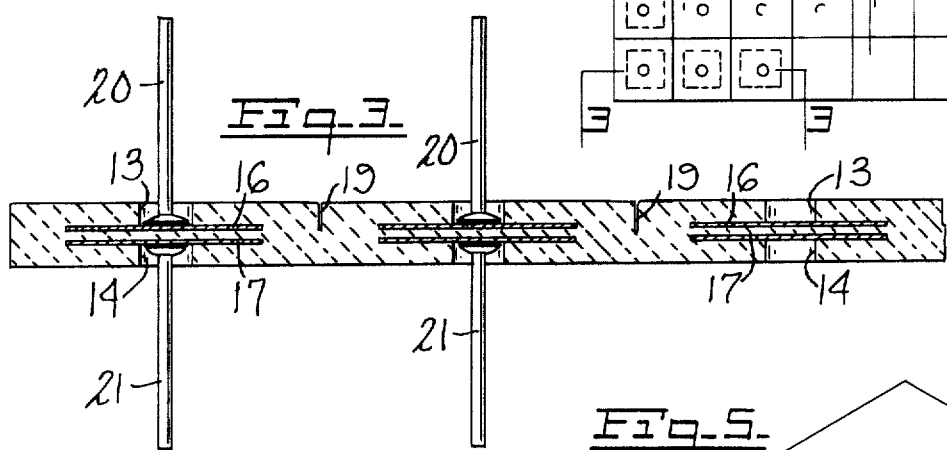
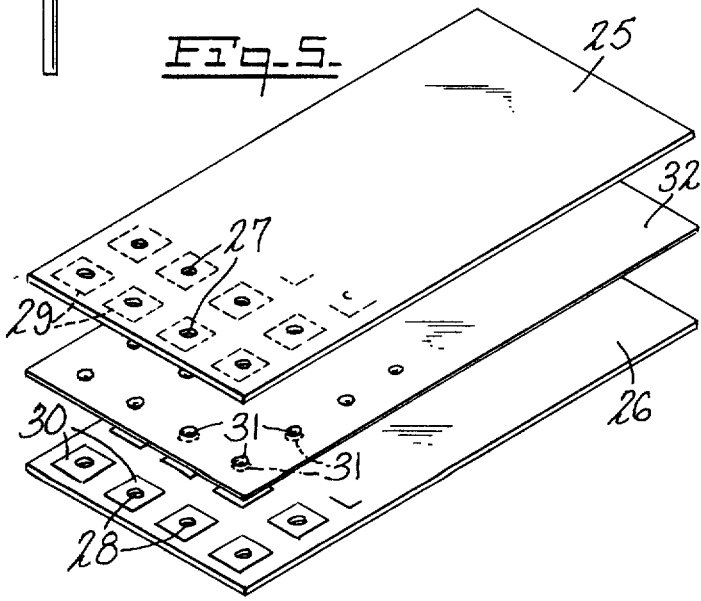
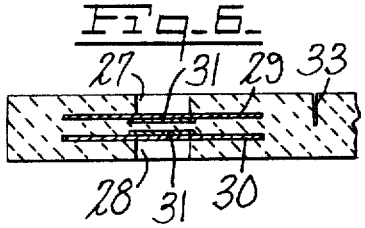

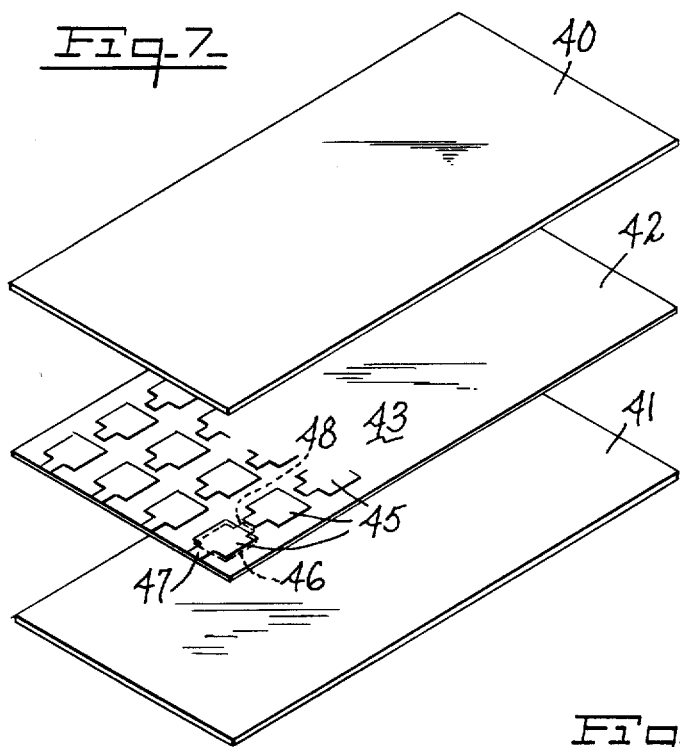
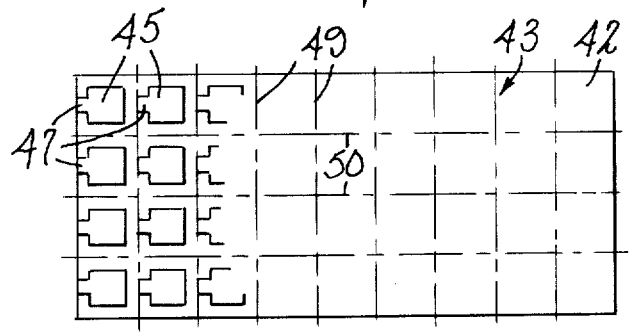
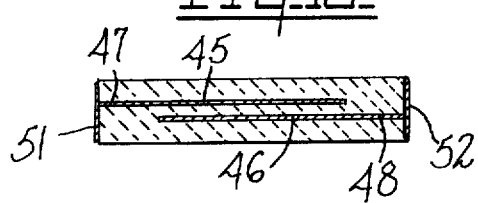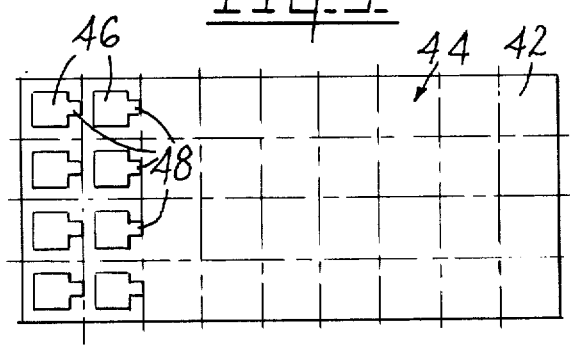

METHOD OF MAKING CERAMIC CAPACITOR

This invention relates to capacitors and more particularly relates to ceramic capacitors having a higher capacitance value, and a method of making the same.

The present invention is directed to capacitors which are of the single layer type, that is, include only two electrodes with a dielectric spacing therebetween, where such capacitors are manufactured in multiple. At the present time, capacitors of the type to which this invention relates are made with a fired ceramic dielectric which, after curing, is coated with a conductive substance on each side thereof. The dielectric is then cut into individual capacitors, leads applied, and the ceramic with conductive coatings thereon encapsulated in an insulating material.

The production of this single layer type capacitor by present methods results in a capacitor of limited capacitance value primarily due to the thickness of the ceramic dielectric. The dielectric must be made sufficiently thick to have the required physical strength for handling both in a greenware state and in the fired state, and also which is sufficiently thick so that it will not unduly warp when the ceramic greenware is fired.

The present invention provides a new and improved method of manufacturing single layer capacitors which enables the use of very thin ceramic spacers between the capacitor electrodes and permits a plurality of capacitors to be defined on a strip of ceramic greenware in such a manner as to decrease the possibility of leakage between the capacitor electrodes.

Briefly stated, the invention in one form thereof comprises the steps of defining a plurality of conductive patterns on opposite sides of a thin sheet of ceramic greenware, covering said thin sheet on either side with other sheets of ceramic greenware having apertures therein in registry with the conductive pattern, scoring the laminations between conductive patterns, firing the laminate to produce a cured ceramic containing a multiplicity of capacitors, attaching leads to the capacitor electrodes through the apertures, and thereafter breaking individual capacitors from the sheet at the score lines.

An object of this invention is to provide a new and improved method of making single layer capacitors in multiple.

Another object of this invention is to provide a method of making single layer capacitors in multiple which permits such capacitors to be made in greatly increased capacitance values for a given size.

A further object of this invention is to provide a method of making single layer capacitors in multiple which facilitates the handling of the capacitive elements.

A still further object of this invention is to provide a new and improved ceramic capacitor of increased capacitance value for a given electrode area.

The features of the invention which are believed to be novel are particularly pointed out and distinctly claimed in the concluding portion of this specification. The invention, however, both as to its organization and operation, together with further objects and advantages thereof, may best be appreciated by reference to the following detailed description taken in conjunction with the drawings, wherein:

FIG. 1 is a view in perspective of a multiple capacitor construction embodying the invention;

FIG. 2 is a top view of a multiple capacitor construction made in accordance with the invention;

FIG. 3 is a longitudinal sectional view seen in the plane of lines 3—3 of FIG. 2, with leads attached;

FIG. 4 is a view of a single capacitor made in accordance with the invention;

FIG. 5 is a view similar to FIG. 1 showing another method of practicing the invention;

FIG. 6 is a sectional view of a capacitor made in accordance with the structure of FIG. 5;

FIG. 7 is a view in perspective of another multicapacitor structure made in accordance with the invention;

FIGS. 8 and 9 are views of opposite sides of one of the elements of FIG. 7 showing capacitor electrodes defined thereon; and FIG. 10 is a longitudinal sectional view of a single capacitor made in accordance with the embodiment of FIGS. 7 – 9.

FIGS. 1 - 3 exemplify an assembly 10 of single layer capacitors in multiple and comprises first and second strips 11 and 12 of ceramic greenware in strip form. Strips 11 and 12 have a plurality of perforations 13 and 14, respectively, defined therein in a coordinate arrangement. A central strip of ceramic greenware 15 has a plurality of conductive areas 16 on one side and a like plurality of conductive areas 17 on the other side. The opposite areas or patterns 16 and 17 are parallel and in vertical alignment when the strips are horizontally disposed.

The strips 11, 15 and 12 are laminated together under heat and pressure, then scored as shown in FIGS. 2 and 3 along coordinate lines 18 and 19 to provide breaking or snapping lines. The laminated and scored assembly is then fired at a high temperature to fuse the ceramic. Thereafter, connector leads 20 and 21 preferably of the nailhead type are positioned in perforations 13 and 14, respectively, and bonded to patterns 16 and 17. Then rows of capacitors may be snapped or broken from the assembly at the score lines 18 and individual capacitors at the score lines 19, or vice versa.

In the practice of the invention, the strips 11, 12 and 15 are slip cast to the desired thickness from a mixture comprising ceramic particles, plasticizer binder and solvent. In one example, the cermaic may be lead barium niobate (PBN) mixed with liquid methyl methacrylate and Monsanto Chemical Company number 160 Santicizer (plasticizer) and an ethylene dichloride solvent. The resulting mixture is slip cast to the desired thickness, dried, and cut into strips of predetermined size. The mixture may be ceramic 40–70%, binder 20–50%, plasticizer 1–4%; and solvent 10–20%. The mixture is blended and then cast. After a period of air drying, the resultant strip or tape may be dried at elevated temperatures of 200° – 400°F to completely drive out solvents, water, etc. The strips 11 and 12 are then perforated in the illustrated coordinate pattern. The strips 15 are coated with the conductive patterns 16 and 17 on each side thereof. The three strips are then laminated to a homogeneous assembly.

The conductive patterns are defined on strips 15 in any suitable manner. One technique is to utilize a screening process wherein conductive material in a liquid vehicle is screened or squeezed through a screening pattern. A suitable substance for this process is Quick Film Conductor Ink No. MB1–169 of Matthey Bishop, Inc., Melvern, Pa. which contains a gold, palladium and platinum in a thick liquid binder. The binder burns off when the ceramic is fired leaving a metallized conductor.

Where the strip 15 is extremely thin, and therefore not easily handled, the patterns 16 may be placed on a release surface, the strip 15 laid or cast on patterns 16 and on the release surface; patterns 17 are then screened on the upper surface. One of the strips 11 and 12 is placed on strip 15 over patterns 17. The strips are then peeled upwardly taking patterns 16 from the release surface, and then the other strips 11 or 12 is applied to strip 15 over patterns 16. The assembly is then laminated, scored and fired. The strips may be laminated at a pressure of 2000 psi and a temperature of 120°F.

In this technique the release surface may be substantially transparent or translucent, and the greenware strip due to its small thickness is also translucent. A source of light may be placed behind the release surface to illuminate the patterns through the greenware strip.

Firing of the above-described assembly may be accomplished in a through oven with an entrance-exit time of six hours, where the assembly is exposed to a top temperature of 2300°F for approximately 1 hour. The time and temperature may vary in accordance with various types of ceramic which may be used. Upon firing or sintering the organic constituents of the green ceramic strips or sheets volatize and the ceramic becomes a monolithic structure.

The physical strength of the fired ceramic, it is preferred that the overall thickness be at least 0.002 inch. The strips 11 and 12 are therefore on the order of 0.001 inch or greater while the strip 15 may be only 0.0005 inch thick.

Inasmuch as the capacitance value of each unit is proportional to the spacing between the conductors 16 and 17, as well as the area of the patterns, the minimal thickness of the strip provides individual capacitors of greatly increased capacitance value.

In one product, conductors 0.103 inch on sides are defined in eight columns of 23 on a strip 15, 1¼ by 4½ inches and 0.001 inch thick. The perforations are made 0.050 inch to accept connectors having 0.045 inch heads. This product with a strip 15 which is 0.001 inch thick yields capacitors of over 3800 picofarads.

The connectors may be formed for predetermined spacing of the leads. FIG. 4 illustrates and individual capacitor 22 having connectors 20a and 21a preformed to provide a predetermined dimension therebetween. The connectors are applied in multiple, being held in a fixture, inserted into the perforations, and heated in an oven to solder the heads thereof to the conductors. The solder may be initially deposited in the perforations, or the connector heads dipped into a solder bath prior to insertion into the perforations. After the individual capacitors are separated they may be encapsulated and color coded if desired. However, this is not necessary.

In an alternate technique, the center strip 15 may be defined by two strips positioned back-to-back with the conductive patterns defined on the outer surfaces. This permits the center strips to have the patterns defined on only one side and thus decrease the physical handling of one thin strip.

The edges of the conductive patterns are spaced from the score lines which define the physical edges of the individual capacitors. This provides an increased path for any leakage with respect to capacitors where the conductor extends to the physical edge of the capacitor.

Where the conductive patterns are initially applied to a release surface such as release paper, plastic tape, etc., the patterns may be printed by various presses and techniques. The greenware may be applied over the release surface by slip casting, or any other suitable technique.

FIGS. 5 and 6 exemplify another embodiment of the invention. In this embodiment outer strips 25 and 26 are formed with coordinate rows and columns of perforations 27 and 28, respectively. Conductive patterns 29 and 30 are then defined in coordinate rows and columns on the facing surfaces of the strips 25 and 26, respectively. An intermediate strip 32 has coordinate rows and columns of small circles or dots of conductive material 31 defined thereon. The dots, which are preferably circular, but need not be, are of an area larger than the perforations 27 and 28 and are in registry with such perforations so as to complete the conductive surface interrupted by the perforations 27 and 28.

In assembly, the strips 25, 26 and 32 are placed together in alignment laminated under pressure and heat as previously described, and a cross-section of the resulting product will appear as shown in FIG. 6. FIG. 6, however, for purposes of illustration exaggerates the thickness of the conductive patterns and particularly the dots 31, inasmuch as the dots 31 will blend or merge into the patterns 29 and 30. The resulting assembly is scored as previously described and indicated by the score mark 33. Thereafter, the ceramic is fired, leads are applied to the area of the perforations as previously described.

The invention may also be embodied in the making of single layer capacitors of the so-called chip type in multiple, as shown in FIGS. 7 – 10. Plain strips of greenware 40 and 41 are arranged to receive therebetween a strip 42 having opposite sides 43 and 44 as more clearly shown FIGS. 8 and 9. Printed or otherwise defined on the sides 43 and 44 are coordinate rows and columns of conductive patterns 45 and 46, respectively, which are printed in registry on either side and each pattern 45 and 46 has a tab-like extension 47 and 48, respectively, extending in opposite directions to provide leads for terminals.

After assembly of the strips 40, 41 and 42, they are coordinately scored as indicated by the lines 49 and 50 and fired. Thereafter, a strip defined by a score mark 49 may be snapped from the assembly, the ends metallized to provide external electrical connections to the tabs 47 and 48 and individual capacitors may be snapped from each row. This provides the so-called chiptype capacitor wherein the metallized ends 51 and 52 are electrically connected to tabs 47 and 48, respectively, and are adapted to be placed on or in an electrical circuit. A cross-section of such a capacitor is shown in FIG. 10 with metallized opposed edges 51 and 52.

After the assembly of strips and lamination thereof, the score marks may be defined in any suitable manner. This may be done by a knife-edge wherein the assembled greenware is moved beneath a plurality of knives in coordinate directions. A die may be used, a rectangular grid, preferably heated, may be used to indent the score marks or a laser beam may be utilized for the scoring. Dependent upon the depth and width of the scoring, a score depth of 6 to 25 percent of the overall thickness will be sufficient. Then a force in the range of 8 to 25,000 psi will be all that is required to snap off a row of capacitors. While this pressure in pounds per square inch may seem to be high, it will be apparent that the area involved is extremely small.

In some instances, it may be desirable not to score the greenware assembly prior to curing. In this situation, scoring may be accomplished through use of a laser beam.

The invention further permits the use of a plurality of single layer capacitors in one body, so that a single capacitor structure including a plurality of distinct capacitors may be connected in a circuit. Either a column or row, or even two or three capacitors may be left in an integral strip, and the capicitors connected individually in a circuit. Alternatively, some capacitors may be connected individually, while others would have their leads connected in parallel for increased capacitance.

From the foregoing disclosure it may be seen that the objects of the invention are efficiently attained. While preferred embodiments of the invention have been set forth for purposes of disclosure, it is to be understood that other embodiments to the invention as well as modifications to be disclosed embodiment which do not depart from the spirit and scope of the invention may become apparent to those skilled in the art. Accordingly, the appended claims are intended to cover all embodiments and modifications of the invention which do not depart from the spirit and scope of the invention.

What is claimed is:

1. A method of making single layer capacitors in multiple which comprises providing a first thin flat sheet of ceramic greenware, defining a multiplicity of conductive patterns on either side thereof in alignment to form a multiplicity of opposed individual capacitors, providing second and third sheets, laminating said second and third sheets to either side of said first sheet, thereafter scoring said lamination to define individual capacitors between but not extending to said score marks, firing said laminations to produce a cured ceramic assembly of a multiplicity of single layer capacitors, and thereafter breaking capacitors from said assembly along the score marks.

2. The method of claim 1 wherein said patterns are defined with extending connection leads, said connection leads extending in opposite directions on opposite sides of said first sheet, said scores being made at the ends of said connection leads.

3. The method of claim 1 wherein said second and third sheets each have a multiplicity of apertures therein to provide communication therethrough to said patterns and the method includes the further step of connecting leads to said patterns through said apertures.

4. The method of claim 1 wherein the patterns are defined on at least one side of said first sheet by initially defining the patterns on a release surface, then superimposing said first sheet on said release surface and removing said first sheet from said release surface with the patterns thereon.

5. The method of claim 4 wherein patterns are defined on the other side of said first sheet before said first sheet is removed from said release surface.

6. The method of claim 4 wherein said release surface and said strip and translucent and including the further step of providing illumination behind said release surface.

7. The method of claim 5 wherein said release surface and said strip are translucent and including the further step of providing illumination behind said release surface.

8. The method of claim 1 wherein said first sheet is formed by defining said patterns on two separate sheets and laminating the non-pattern sides of said two separate sheets together.

9. A method of making single layer capacitors in multiple which comprises providing a thin flat first sheet of ceramic greenware, defining a multiplicity of conductive patterns on either side thereof in alignment to form a multiplicity of opposed individual capacitors, providing second and third sheets of ceramic greenware sheets with apertures therein and laminating said second and third sheets to either side of said first sheet with the apertures in registry with said patterns, scoring said lamination to define individual capacitors between but not extending to said score marks, firing said lamination to produce a cured ceramic assembly of a multiplicity of single layer capacitors, and thereafter breaking capacitors from said assembly along said score marks.

10. A method of making single layer capacitors in multiple which comprises providing a thin flat first sheet of ceramic greenware, defining a multiplicity of conductive patterns on either side thereof in alignment to form a multiplicity of opposed individual capacitors, providing second and third sheets of ceramic greenware sheets with apertures therein and laminating said second and third sheets to either side of said first sheet with the apertures in registry with said patterns, firing said lamination to produce a cured ceramic assembly of a multiplicity of single layer capacitors, and separating individual capacitors from said lamination along lines between but not extending to said patterns.

11. The method of claim 10 including the further step of connecting leads to said conductors through said apertures.

12. The method of claim 9 wherein said first sheet is formed by defining said patterns on two separate sheets and laminating the non-pattern sides of said two separate sheets together.

13. A method of making single layer capacitors in multiple comprising the steps of providing first and second sheets of ceramic greenware having a pattern of apertures therein, defining first conductive patterns on one side of each of said sheets encompassing said apertures, providing a third sheet of ceramic greenware, defining second conductive areas on both sides thereof of greater areas than said apertures, laminating said sheets together with said third sheet intermediate said first and second sheets with the conductive areas of said third sheet spanning said apertures, scoring said lamination, firing said lamination, attaching leads to each of said patterns through said apertures, and separating said capacitors from each other after firing along said scores.

14. The method of claim 13 wherein said lamination is scored between said individual capacitors before firing and individual capacitors are broken from the assembly along the scores after firing.

* * * * *